United States Patent
Fang et al.

(10) Patent No.: US 10,079,866 B2
(45) Date of Patent: Sep. 18, 2018

(54) POTENTIAL ECHO DETECTION AND WARNING FOR ONLINE MEETING

(71) Applicant: Cisco Technology, Inc., San Jose, CA (US)

(72) Inventors: Jianbin Fang, Hefei (CN); Mingfeng Yang, Hefei (CN); Yasi Xi, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 15/265,952

(22) Filed: Sep. 15, 2016

(65) Prior Publication Data

US 2018/0077205 A1    Mar. 15, 2018

(51) Int. Cl.
| | |
|---|---|
| *H04L 12/18* | (2006.01) |
| *H04L 29/06* | (2006.01) |
| *H04L 29/08* | (2006.01) |
| *G10L 21/0216* | (2013.01) |
| *G10L 21/0208* | (2013.01) |

(52) U.S. Cl.
CPC ........ *H04L 65/403* (2013.01); *G10L 21/0216* (2013.01); *H04L 67/26* (2013.01); *G10L 2021/02082* (2013.01); *G10L 2021/02166* (2013.01); *H04L 12/1822* (2013.01); *H04L 65/607* (2013.01); *H04L 67/10* (2013.01); *H04L 67/42* (2013.01)

(58) Field of Classification Search
CPC ... H04L 65/403; H04L 67/26; H04L 12/1822; H04L 67/42; H04L 67/10; H04L 65/607; G10L 21/0216
USPC ........................................ 709/204, 201, 217
See application file for complete search history.

(56) References Cited

U.S. PATENT DOCUMENTS

| | | | | |
|---|---|---|---|---|
| 4,435,984 A | * | 3/1984 | Gruber ................... | G01N 29/07 73/1.82 |
| 5,315,585 A | * | 5/1994 | Iizuka ..................... | H04B 3/23 370/289 |
| 5,587,998 A | * | 12/1996 | Velardo, Jr. ............ | H04B 3/21 370/289 |
| 6,141,406 A | * | 10/2000 | Johnson .................. | H04B 3/23 370/290 |
| 7,477,282 B2 | * | 1/2009 | Firestone ............ | H04L 12/1822 348/14.09 |
| 7,903,137 B2 | | 3/2011 | Oxford et al. | |
| 8,150,052 B2 | | 4/2012 | Gygax et al. | |
| 8,391,472 B2 | | 3/2013 | Ghani et al. | |

(Continued)

FOREIGN PATENT DOCUMENTS

| | | | | |
|---|---|---|---|---|
| JP | 07183835 A | * | 7/1995 | ............. H04M 3/56 |
| WO | WO 2016050107 A1 | * | 4/2016 | ............. H04M 3/56 |

*Primary Examiner* — Frantz Coby
(74) *Attorney, Agent, or Firm* — Parker Ibrahim & Berg LLP; James M. Behmke; Stephen D. LeBarron

(57) ABSTRACT

In one embodiment, a conferencing device detects a potential echo effect between two or more of a plurality of participant devices in an online conference the two or more participant devices being co-located. The conferencing device presents an echo warning to a user interface of a particular one of the co-located participant devices, in response to detecting the potential echo effect. The conferencing device groups the co-located participant devices into a group. The conferencing device provides audio data from a selected one of the co-located participant devices in the group for presentation by the plurality of participant devices as part of the online conference.

20 Claims, 12 Drawing Sheets

(56) References Cited

U.S. PATENT DOCUMENTS

| | | | |
|---|---|---|---|
| 8,896,651 B2 | 11/2014 | Chu et al. | |
| 9,024,998 B2 | 5/2015 | Chu et al. | |
| 2009/0103712 A1* | 4/2009 | Frauenthal | H04M 9/082 379/406.12 |
| 2009/0202063 A1* | 8/2009 | Frauenthal | H04M 9/08 379/406.16 |
| 2010/0135481 A1* | 6/2010 | Frauenthal | H04B 3/23 379/406.06 |
| 2012/0287769 A1* | 11/2012 | Saleem | H04M 9/082 370/201 |
| 2013/0106977 A1* | 5/2013 | Chu | H04N 7/142 348/14.02 |

\* cited by examiner

| 602 | PARTICIPANT 604 | GROUP 606 |
|---|---|---|
| | ALICE | MEETING ROOM A |
| 🎤 ~608 | BOB | MEETING ROOM A |
| | CATHY | MEETING ROOM A |
| | DEEPAK | |

POTENTIAL ECHO DETECTION AND WARNING FOR ONLINE MEETING

TECHNICAL FIELD

The present disclosure relates generally to computer networks, and, more particularly, to the detection and warning of potential echoes during an online meeting.

BACKGROUND

Various forms of media sessions may exist in a communication network. For example, a media session may support conferencing (e.g., with multiple presenters), content streaming (e.g., from a single source to an audience), fax communications, application sharing, and the like. Such a session may convey media of a particular type, such as audio or video, or, alternatively, be a multimedia session that conveys multiple forms of media at the same time (e.g., a video conference with audio, etc.).

During a media session, such as a conference, an echo effect can occur if a sound is captured by multiple microphones. This is a common occurrence when meeting endpoints are within close proximity to one another. For example, if two users are both located in the same conference room and each use their own laptops to connect to the conference, both devices may pick up on a sound, creating an echo effect to the participants.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a conferencing device detects a potential echo effect between two or more of a plurality of participant devices in an online conference the two or more participant devices being co-located. The conferencing device presents an echo warning to a user interface of a particular one of the co-located participant devices, in response to detecting the potential echo effect. The conferencing device groups the co-located participant devices into a group. The conferencing device provides audio data from a selected one of the co-located participant devices in the group for presentation by the plurality of participant devices as part of the online conference.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
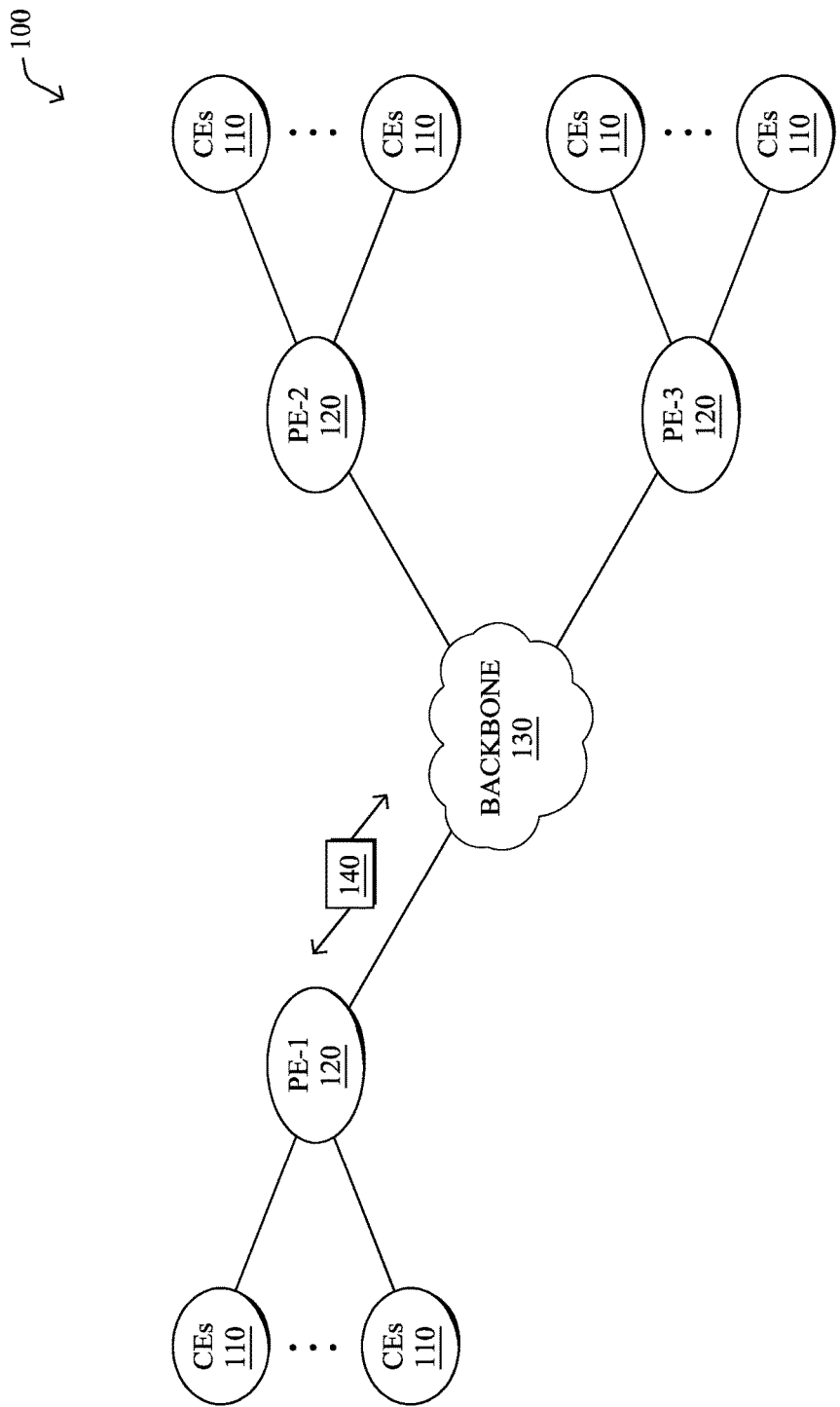
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
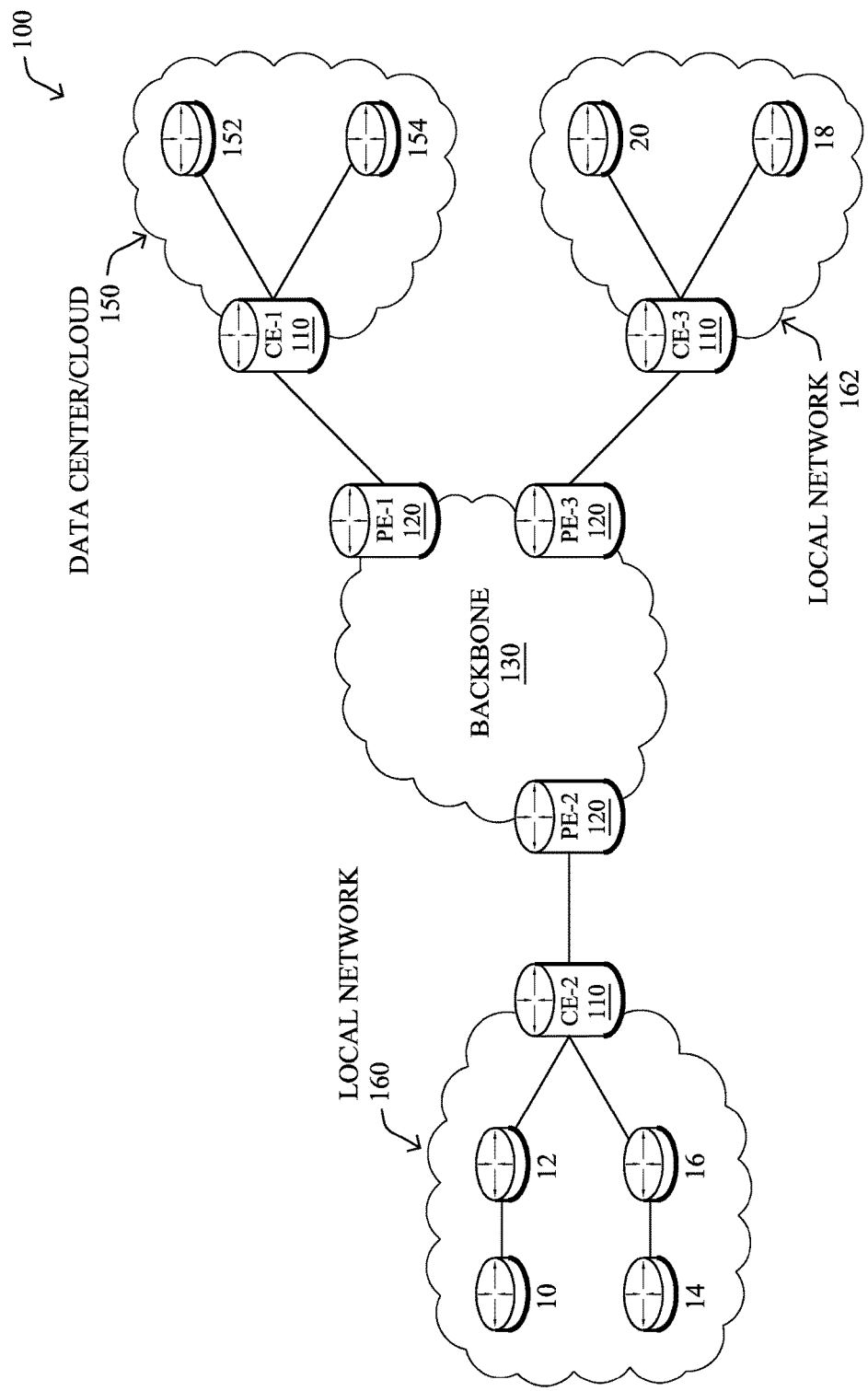

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Figure 2:
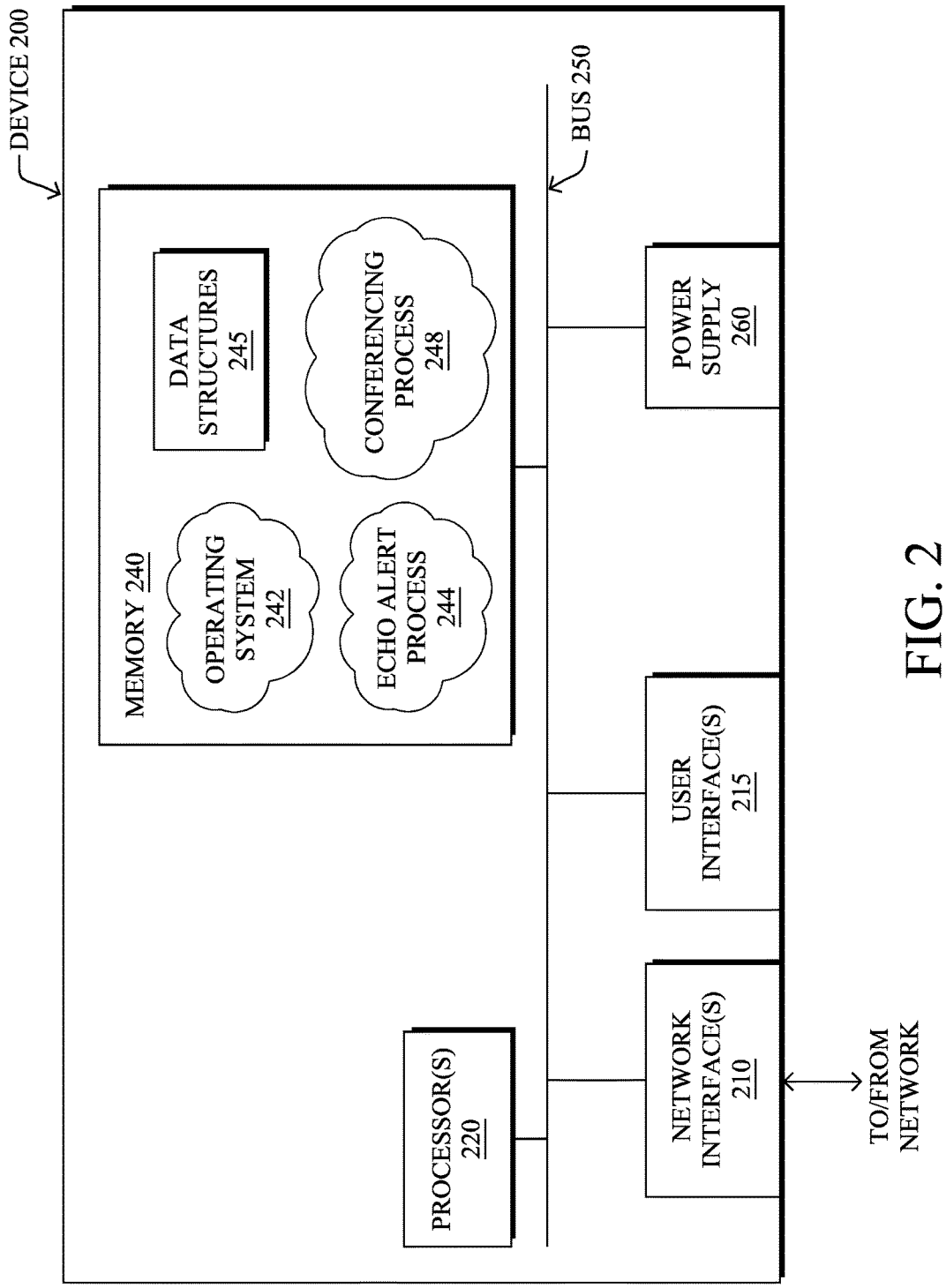
FIG. 2 illustrates an example conferencing device.

FIG. 2 is a schematic block diagram of an example conferencing device/node 200 that may be used with one or more embodiments described herein, e.g., as any of the computing devices shown in FIGS. 1A-1B, particularly nodes/device 10-20, servers 152-154 (e.g., a network controller located in a data center, etc.), or any of the other devices referenced below. The conferencing device 200 may also be any other suitable type of device depending upon the type of network architecture in place. Device 200 comprises one or more network interfaces 210, one or more user interfaces 215, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The user interfaces 215 may include any number of hardware components configured to receive sensory input from a user and/or provide sensory information to a user. For example, user interfaces 215 may include, but are not limited to, an electronic display, a touch-screen display, a touch pad, a mouse, a pointing device, a speaker, a microphone, or the like.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an echo alert process 244 and/or a conferencing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
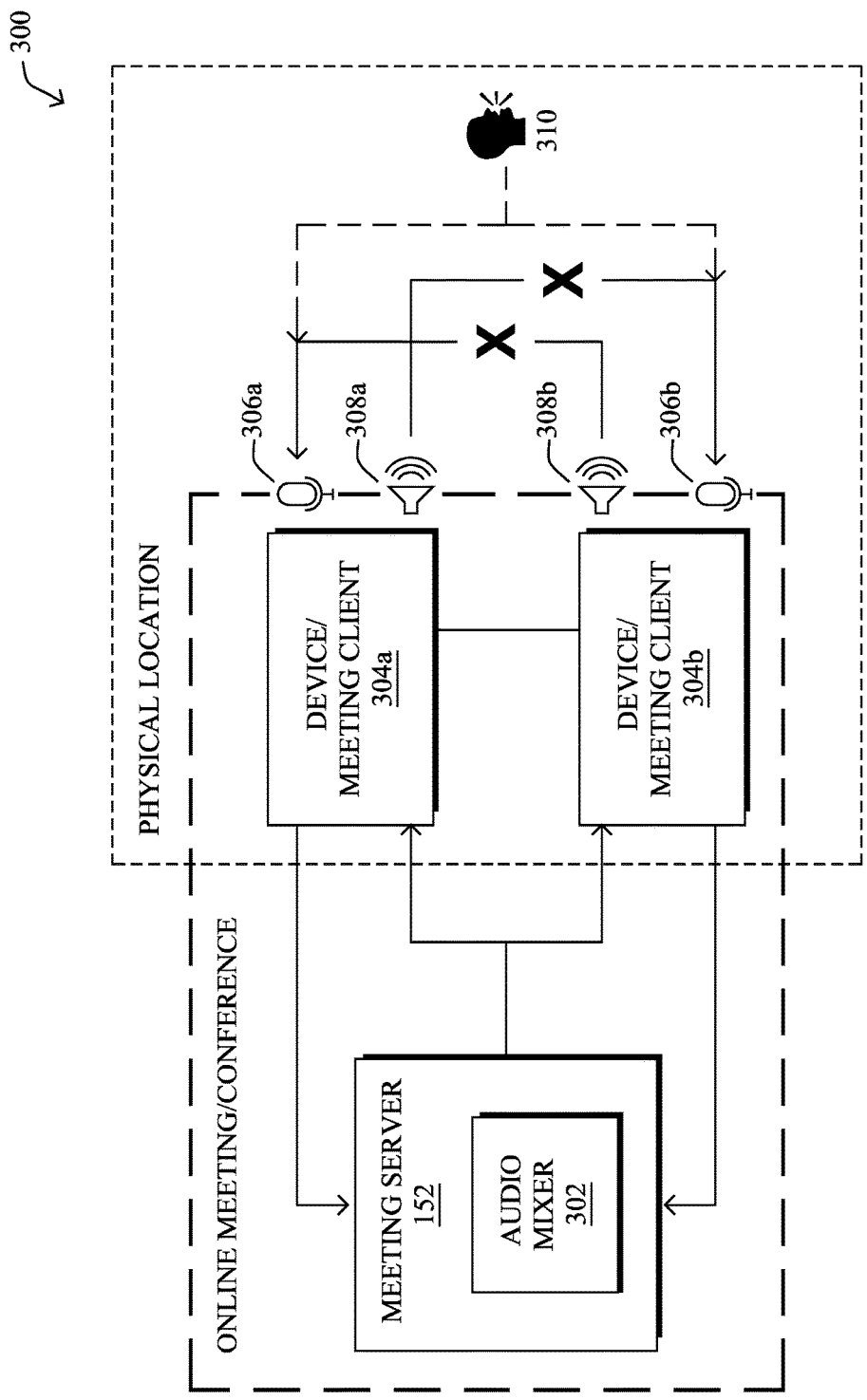
FIG. 3 illustrates an example of co-located participant devices in a conference.

As noted above, the co-location of meeting/conference participant devices can lead to an echo effect in certain circumstances. For example, consider the system 300 illustrated in FIG. 3. As shown, assume that first and second devices/meeting clients 304a-304b are participants in an online conference administered by meeting server 152. Note that in some cases, server 152 may be part of a cloud-based conferencing service. For illustrative purposes, the terms "meeting" and "conference" are used interchangeable herein to describe such an online conference which may convey audio and/or video data between participating devices.

Each of participant devices 304a-304b may include their own respective microphones 306a-306b and/or speakers 308a-308b. During the conference, microphones 306a-306b may capture nearby sound, which is then transmitted to meeting server 152 as audio data. In turn, meeting server 152 may send the audio data to the corresponding other participant devices in the conference. For example, sound captured by microphone 306b of device 304b may be transmitted to device 304a for presentation to the user via speaker 308a.

A conferencing server/service, such as server 152, may also include an audio mixer, such as the audio mixer 302 shown. Generally, audio mixer 302 is configured to combine and/or filter the audio data inputs from the participant devices, to produce the output audio data sent back to the participant devices for presentation to the users. Notably, audio mixer 302 may exclude the audio data received from device 304a from the audio data sent back to device 304b and perform similar function with respect to the other conference participant devices.

An echo condition can occur when conference participant devices are co-located. For example, assume that devices 304a-304b are located in the same physical location, such as a physical meeting room. If both of devices 304a-304b have their audio input connections enabled (e.g., their microphones are not muted), both of microphones 306a-306b may capture the same sounds from a human participant 310 and provide this audio data to meeting server 152 for mixing. In addition, if speakers 308a-308b are also enabled, sound emitted from one speaker may be captured by the microphone of the other device. For example, microphone 306a of device 304a may pick up the sound emitted by speaker 308b of device 304b and vice versa.

In the scenario shown, if the audio data captured by one of the participant devices includes the audio emitted by the other participant device, mixer 302 will traditionally include this captured audio in the output audio sent to the other conference participants. For example, consider the audio captured by device 304a that includes the sound emitted by device 304b. When mixing the input audio from devices 304a-304b, mixer 302 may send the audio data from device 304a to device 304b that includes the sounds already emitted by device 304b, thereby creating an echo effect. Even if the device is then muted, this echo effect may continue on for some time. A similar effect occurs to all of the other conference participants, as well, regardless of their location.

Potential Echo Detection and Warning for Online Meeting

The techniques herein provide detection and warning mechanisms for an online conference that notify users about potential echo effects when joining a conference. In some aspects, the participants may test for echo conditions when joining the conference by emitting test sounds. In other aspects, location information regarding the participant devices can be used to detect the potential for echo effects. In further aspects, the techniques herein introduce the concept of an audio sharing group for co-located participant devices, allowing the active audio connection to be passed between the devices in the group.

Specifically, according to one or more embodiments of the disclosure as described in detail below, a conferencing device detects a potential echo effect between two or more of a plurality of participant devices in an online conference the two or more participant devices being co-located. The conferencing device presents an echo warning to a user interface of a particular one of the co-located participant devices, in response to detecting the potential echo effect. The conferencing device groups the co-located participant devices into a group. The conferencing device provides audio data from a selected one of the co-located participant devices in the group for presentation by the plurality of participant devices as part of the online conference.

Illustratively, the techniques described herein may be performed by hardware, software, and/or firmware, such as in accordance with the conferencing process 248, which may include computer executable instructions executed by the processor 220 to perform functions relating to the techniques described herein, e.g., in conjunction with echo alert process 244.

Operationally, the techniques herein attempt to detect the potential for an echo effect when a new participant joins a conference. In turn, the system may present a warning to the joining user as to the potential echo effect, allowing the user to decide how to proceed (e.g., by muting his or her microphone, etc.). This differs significantly from other approaches that may attempt to prevent echo effects by performing complex analysis and processing on all of the audio inputs from the participant devices.

Figure 4A:
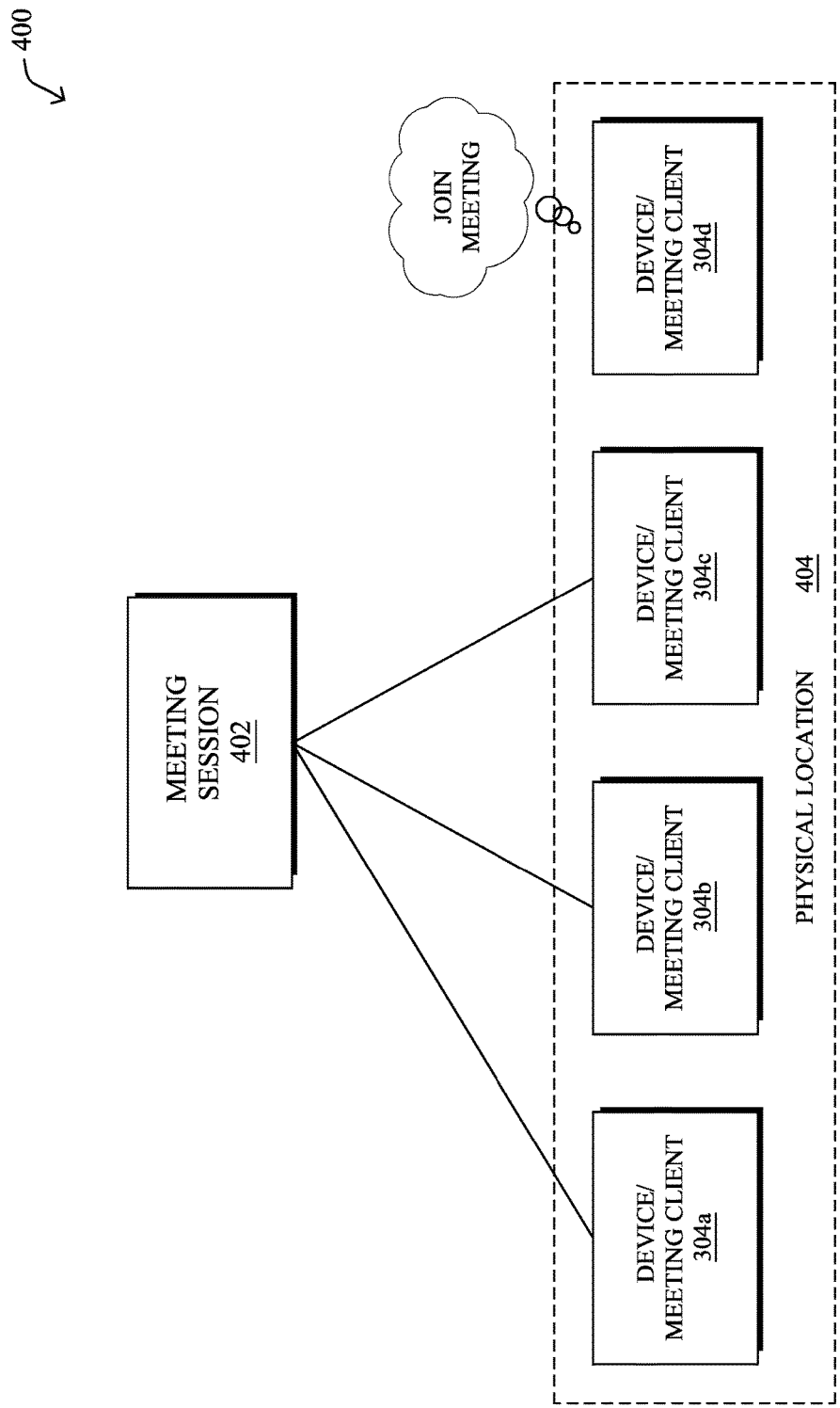
FIGS. 4A-4E illustrate an example of the detection of a potential echo effect using an echo test.

FIGS. 4A-4E illustrate an example of the detection of a potential echo effect using an echo test, according to various embodiments. As shown in FIG. 4A, assume that all of participant devices 304a-304d are co-located in a physical location 404 such that audio emitted by one of devices 304a-304d can be picked up as sound by one or more of the other devices 304a-304d. For purposes of illustration, also assume that devices 304a-304c have already joined a meeting session 402 (e.g., via a meeting server/service, such as server 152) and that device 304d wishes to join meeting session 402. In addition, assume that while devices 304b-304c are also participants in meeting session 402, both devices do not have audio connections to meeting session 402, but instead rely on the audio connection of participant device 304a.

Figure 4B:
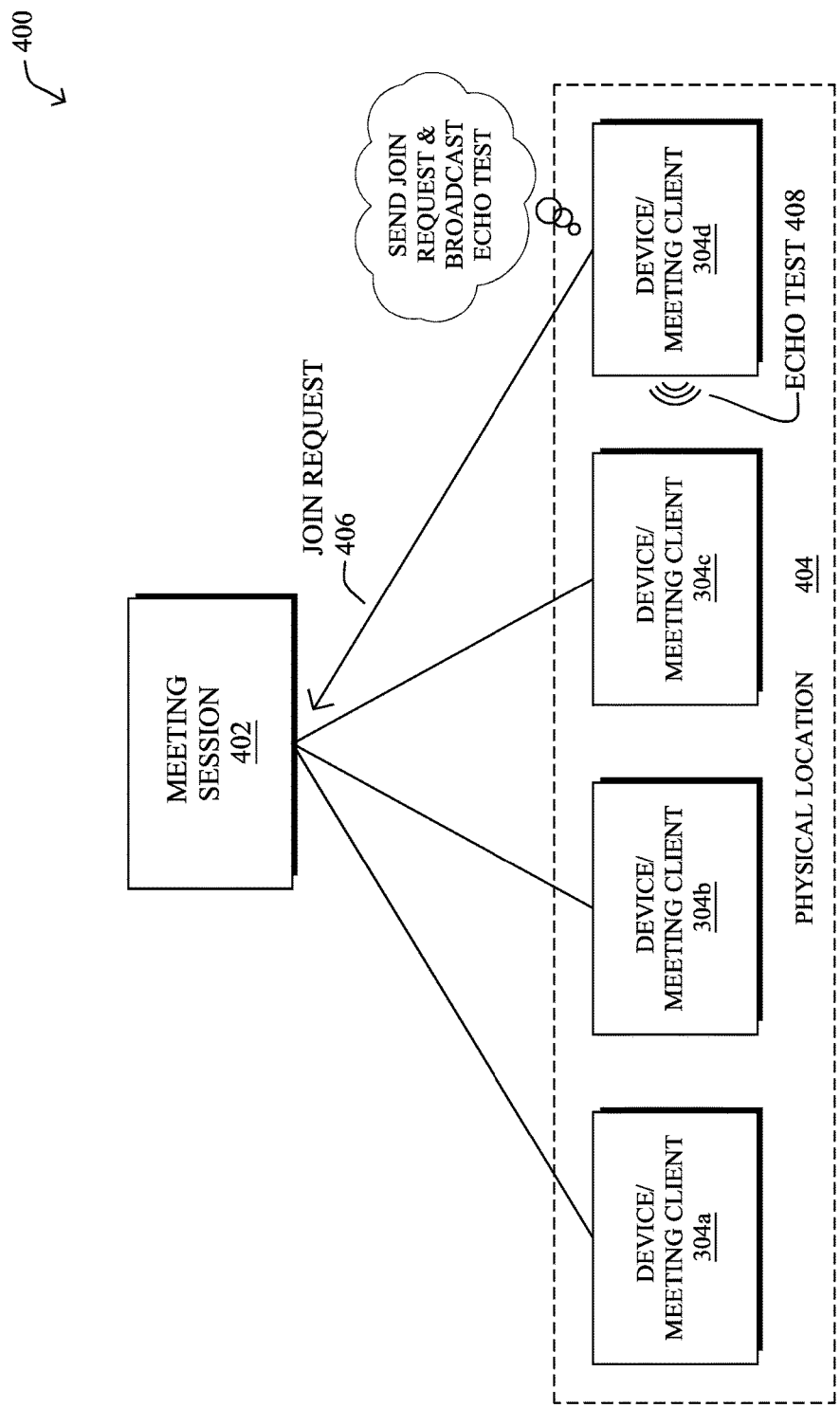

As shown in FIG. 4B, device 304d may initiate joining meeting session 402 by sending a join request 406 to the meeting server/service. According to various embodiments, device 304d may also initiate an echo test at or around the same time. As part of the test, device 304d may broadcast an echo test sound 408 via its speaker(s) for receipt by any other participant devices in the same vicinity. In some embodiments, test sound 408 may be sent at a high frequency that is outside of the normal hearing range of a human, so as not to affect the nearby users.

Figure 4C:
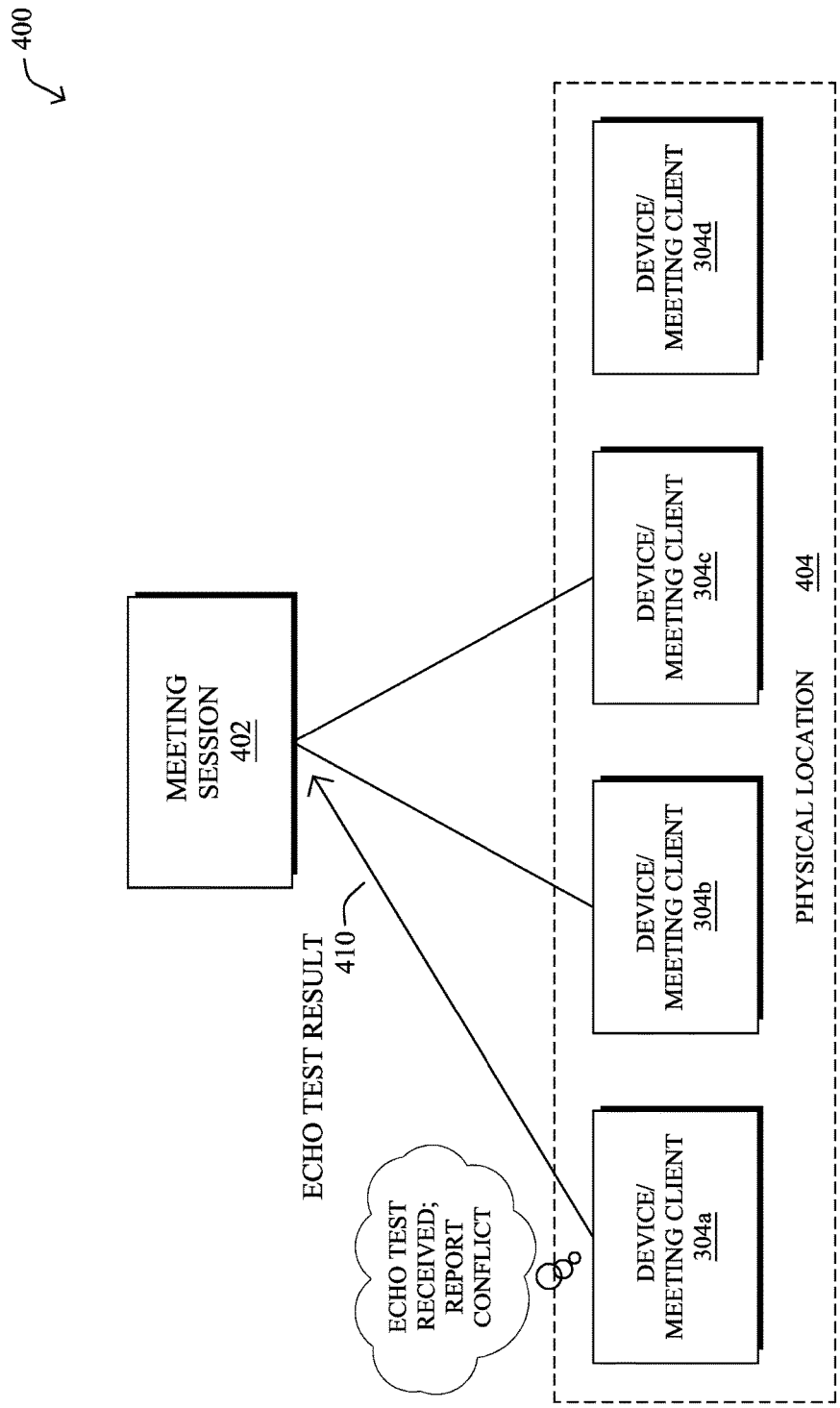

In FIG. 4C, if device 304a is within range of device 304d, the microphone of device 304a may pick up test sound 408 emitted by device 304d. Based on this reception, device 304a may determine that there is a potential conflict between devices 304a and 304d due to their proximity, which may result in a potential echo effect if left unaddressed. In turn, device 304a may send a result 410 of the echo test to the administrator of meeting session 402, indicating that there is the potential for an echo effect attributable to device 304d. For example, in one embodiment, test sound 408 may include the meeting/conference number and an identifier for device 304d, thereby signaling to device 304a that device 304d is joining the meeting/conference and is within proximity of device 304a. In turn, device 304a may include the meeting/conference ID, the device ID of device 304d, and/or an identifier for device 304a in echo test result 410, thereby notifying the server/service in charge of media session 402 of the co-location of devices 304a and 304d.

Figure 4D:
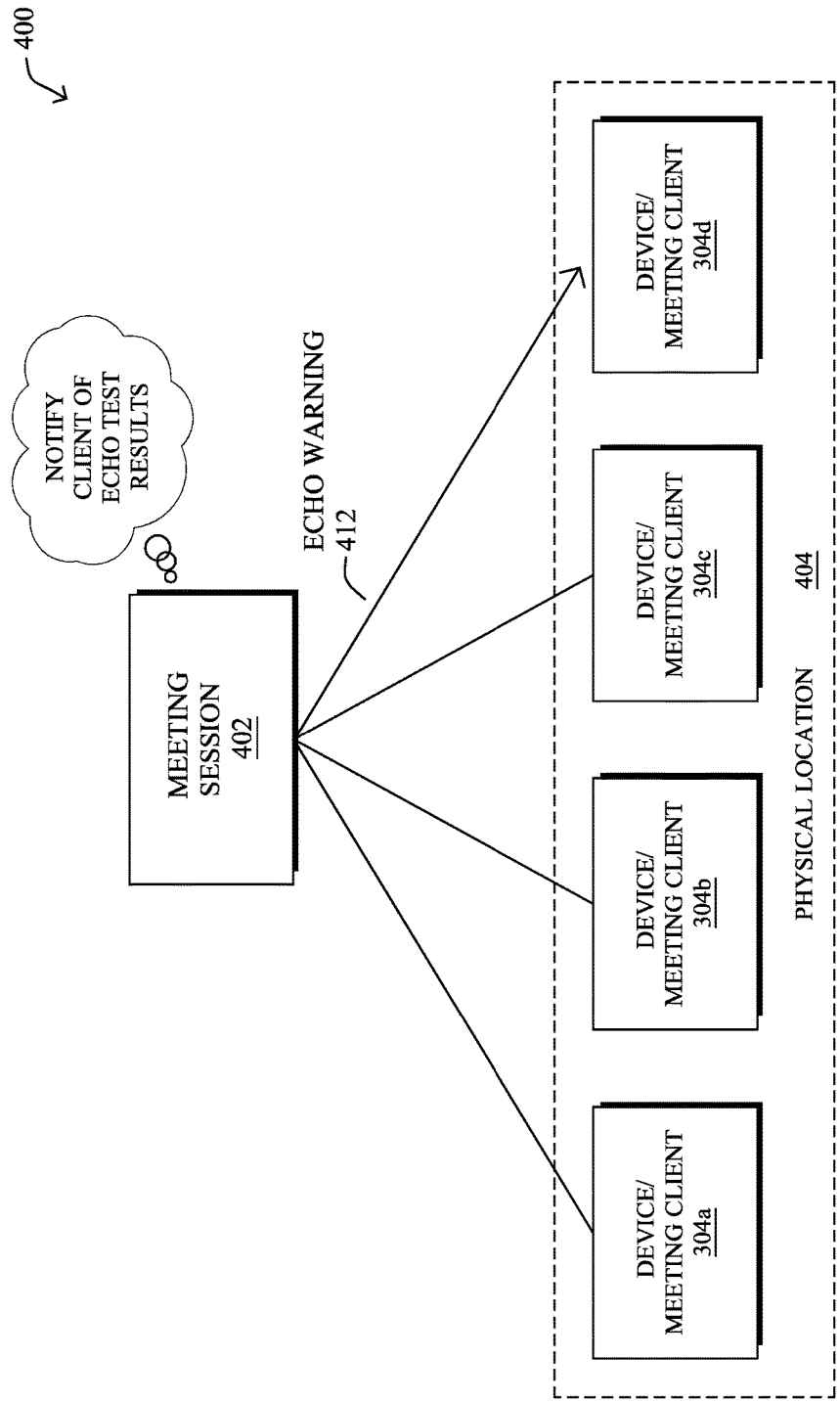

In FIG. 4D, the server/service in charge of media session 402 may notify joining device 304d of the results of the echo test via an echo warning message 412. Thus, as part of the joining process, device 304d is able to receive feedback as to whether or not enabling audio on device 304d may lead to a potential echo effect during the conference.

Figure 4E:
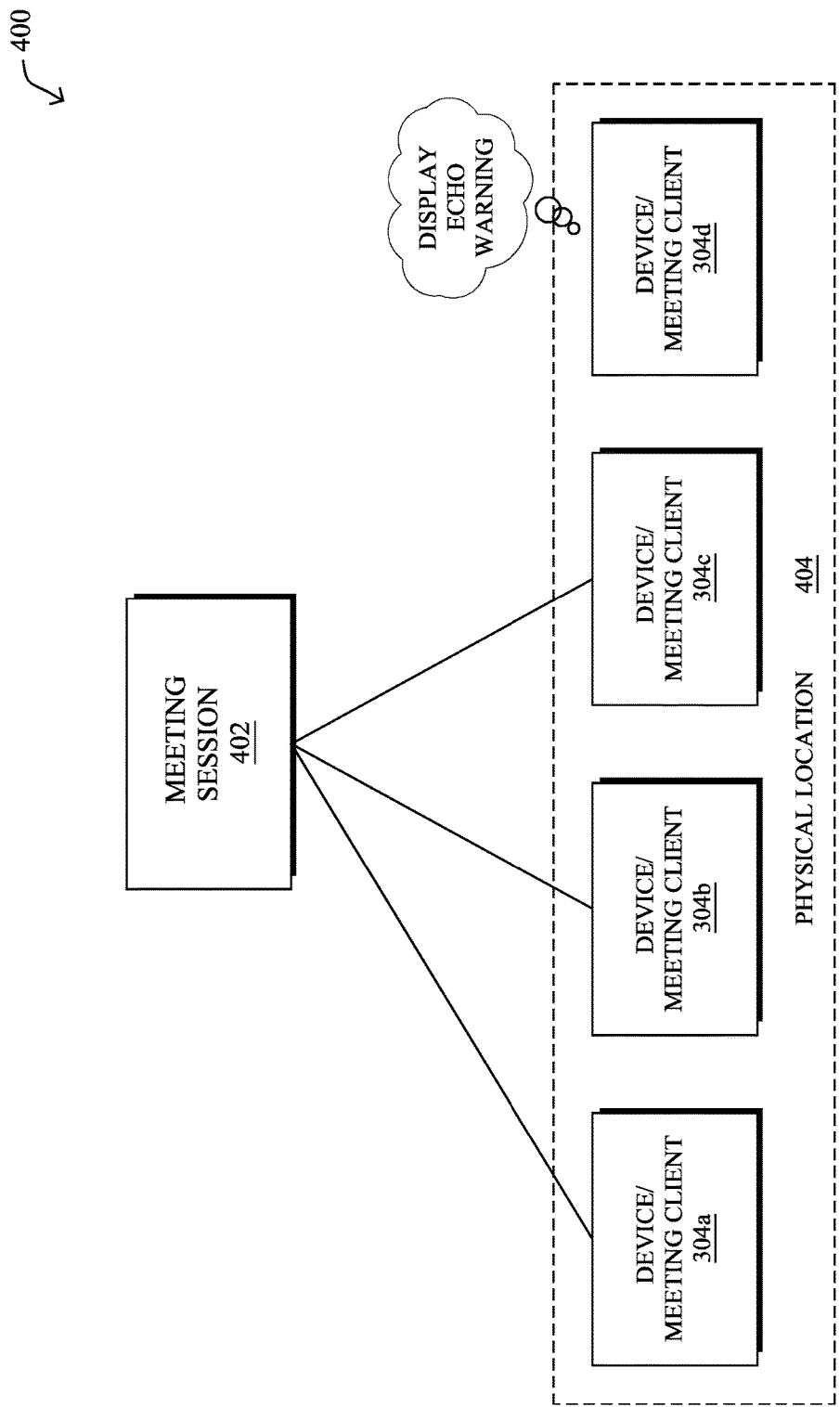

In FIG. 4E, in various embodiments, device 304d may display a warning to its user regarding the potential echo effect. Such a warning may, for example, inform the user that he or she is within range of an already active participant device in the conference (e.g., that a potential for an echo effect exists) and ask for a confirmation as to whether the user still wishes device 304d to join the conference and/or activate its audio functions for the conference.

In some cases, there may be a slight delay between when the server/service receives join request 406 from device 304d and the echo test results 410 from existing participant device 304a. To avoid any echo effects in the interim, the server/service may implement a delay after receiving join request 406 before adding device 304d as a participant in the conference. For example, the service may wait 0.5-1.0 seconds before deciding to add device 304d to the conference without an echo warning. After the waiting time, if a conflict notification is later received, the service may still send out an echo warning to device 304d, in one embodiment.

Figure 5:
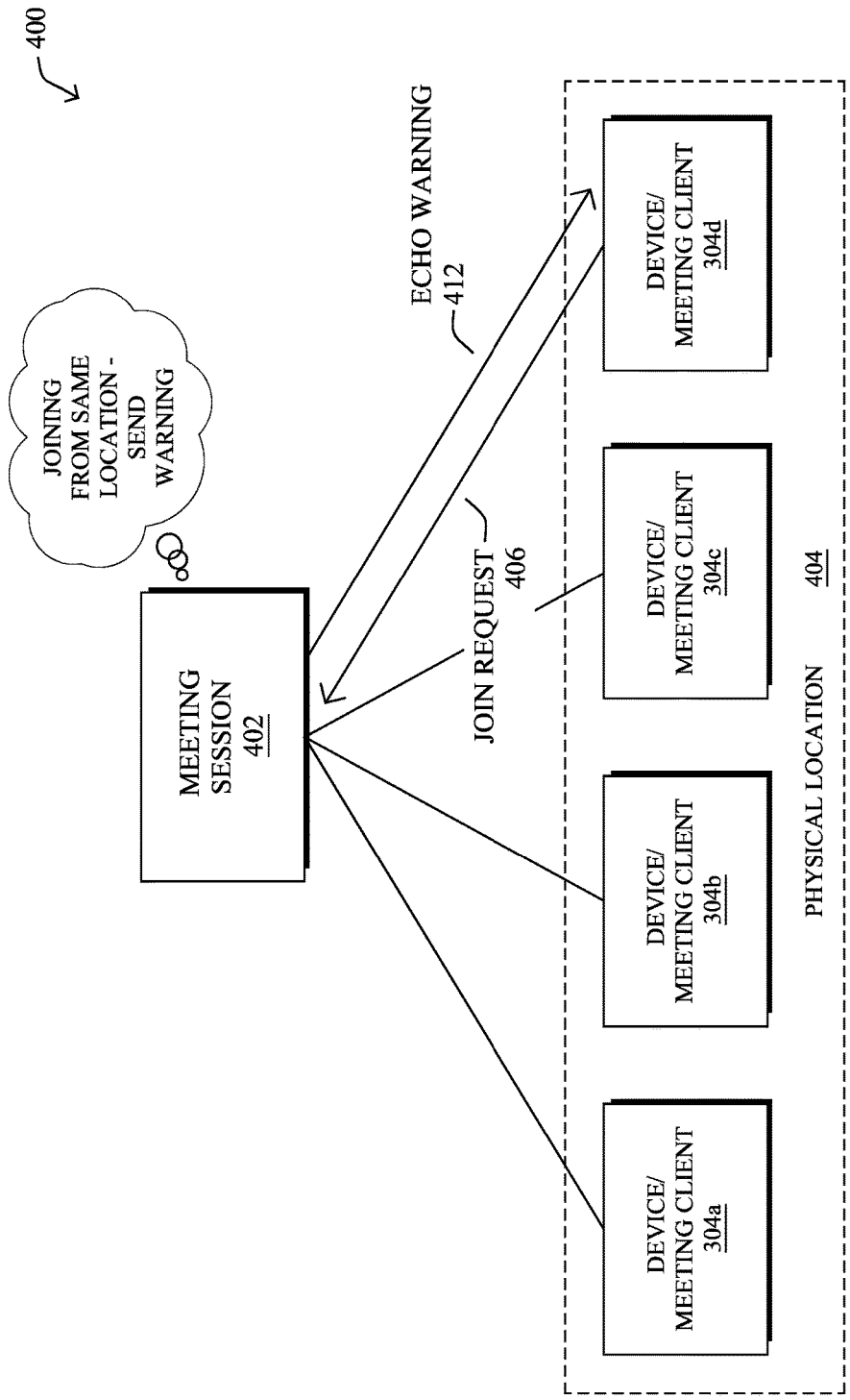
FIG. 5 illustrates an example of the detection of a potential echo effect using device location information.

Referring now to FIG. 5, another example is shown of the detection of a potential echo effect using device location information, according to various embodiments. In addition to, or in lieu of, a device sending out an echo test, the conference server/service may also use any available location information for the devices, to determine whether a potential echo effect exists. Notably, various mechanisms may send location information to the server/service that indicate whether any of the participant devices are co-located. For example, the Cisco Intelligent Proximity™ application by Cisco Systems, Inc. or another collaboration or telepresence mechanism may capture information regarding the location of the devices, such as the meeting room in which a particular device is located. In further embodiments, the participant devices themselves may provide location information to the server/service for analysis.

As shown, when device 304d attempts to join the conference by sending a join request 406, the server/service may identify that device 304d is co-located in the same physical location as device 304a which already has an active audio connection to meeting session 402. In turn, the server/service may determine that the co-location of devices 304a and 304d could give rise to an echo effect and may send echo warning 412 back to device 304d for display as a warning to the user. Notably, if an audio connection is already established with a device in physical location 404 (e.g., a telepresence device in a meeting room, etc.), the server/service may alert the user of a joining device as to the potential for echo if the user proceeds to complete the joining operation.

In various embodiments, the techniques herein also provide for the grouping of participant devices that are co-located. In particular, based on echo testing and/or device location data, the conference server/service now has knowledge of which participant devices are co-located. In turn, the server/service may be configured to allow the users to appoint an "active audio presenter" for the group. For example, FIG. 6 illustrates an example display screen 600 for a conferencing application.

Figures 6, 7:
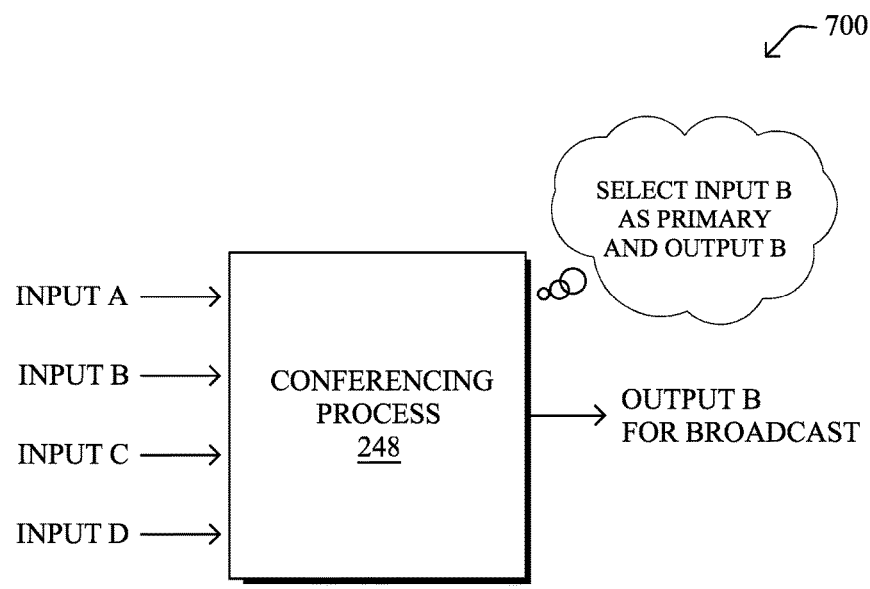
FIG. 6 illustrates an example display screen for a conferencing application.
FIG. 7 illustrates an example of the pre-processing of audio inputs from multiple co-located devices.

As shown in FIG. 6, display screen 600 may be a window or portion thereof of the conferencing application executed and displayed by a participant device (e.g., conferencing process 248). In particular, display screen 600 may include a listing 604 of the user participants in the conference, an indication 602 of their respective statuses, and/or grouping information 606 based on the locations of their devices. Notably, assume that users Alice, Bob, and Cathy are all using devices co-located in a physical location, meeting room A. However, Deepok is using a remotely located device and is not part of the same location group.

In various embodiments, the conferencing service may be configured to allow those in a location group to elect an active audio presenter. For example, as indicated by icon 608, the device operated by Bob may be enabled for audio, to serve the entire location, meeting room A. Said differently, users Alice and Cathy may elect to simply rely on the audio of the device operated by Bob, rather than enable the audio on their own respective devices. As would be appreciated, by having only a single audio presenter in any given location, this would eliminate any potential for echo effects during the conference.

The audio presenter for a given location group may also be selectable. For example, if Cathy wishes to take over the role of audio presenter, she may drag icon 608 next to her own name. In doing so, audio may be enabled for the device operated by Cathy and the audio of Bob's device may similarly be disabled, to prevent an echo effect from occurring. As noted previously, even if multiple devices are in the same location group, the system may nonetheless allow multiple users to enable their audio, in some cases (e.g., after rejecting an echo warning, etc.).

In some cases, even if a device in a location group is not the audio presenter, its microphone may still remain active for purposes of receiving echo tests from other co-located devices. For example, turning again briefly to FIGS. 4B-4C, even if device 304a is the active audio presenter, if the microphones of devices 304b-304c are enabled, devices 304b-304c may independently receive echo test 408. In turn, devices 304b-304c may send echo test results back to the conference server/service, to prompt an echo warning to device 304d.

To increase the awareness of the new user (e.g., the user device 304d), the echo warning displayed by device 304d may also alert the new user as to the current audio presenter in the location (e.g., device 304a). As noted previously, the new user may still explicitly ignore the warning, in some embodiments. For example, by default, the audio of the joining device may be disabled or muted until the user provides feedback regarding the echo warning. If the user does not explicitly agree, the device may continue to disable or mute the audio of the newly joined device. However, if the user disagrees with the warning, he or she may provide input to the interface that enables the audio of the newly joined device.

Referring now to FIG. 7, an example 700 is shown of the pre-processing of audio inputs from multiple co-located devices, according to various embodiments. As noted, some embodiments provide for the microphones to be active even on devices that are not the active audio presenter. In such cases, the corresponding audio inputs may be sent to conferencing process 248 on the server/service for pre-processing, potentially with flags to indicate which of the audio inputs were sent by participant devices that are not currently active audio presenters. For example, as shown, assume that devices 304a-304d each send audio data from their respective microphones to the conference server/service as audio inputs A-D.

In contrast to traditional mixing, conferencing process 248 may attempt to select which of the audio inputs A-D should be selected as the representative audio for the entire location group. In one embodiment, conferencing process 248 may compare the signal strengths of audio inputs A-D, to determine which input is strongest. For example, conferencing process 248 may select audio input B as the primary audio input for the location group based on audio input B being the strongest/loudest. In turn, conferencing process 248 may output only audio input B for further processing (e.g., for mixing with audio from devices in other locations) and filter out audio inputs A and C-D.

In some embodiments, conferencing process 248 may also dynamically switch the active audio presenter from among the devices in the location group based on the pre-processing. For example, assume that audio input A is from the current audio presenter for the meeting room, but that conferencing process 248 selects audio input B for presentation to the other participants instead. In such a case, conferencing process 248 may dynamically switch to designating the device that originated audio input B as the active audio presenter (e.g., by updating display screen 600, etc.). So long as only one audio input is used at any given location, this will still prevent echo effects from occurring during the conference. In addition, this may signify to all of the participant users who is the current presenter from among the location group, since the current presenter is likely to have the strongest corresponding audio input.

In further embodiments, a moderator may be appointed to any given location group and may even be the meeting host. In some cases, such a moderator may be authorized to set a fixed audio input for the location group, to override any intermediate processing and ignore other audio inputs from the location group. Additionally, the moderator may be able to select between modes, such as the mode in which non-presenters are muted and the mode in which intermediate processing is used to select the audio input for the location group.

A further enhancement of the techniques herein applies to the special case in which some users are using headphones. In such cases, both of the audio inputs and outputs of the device may be enabled, since their audio inputs do not present the same potential for echo effects (e.g., another microphone is unlikely to pick up the sound generated by the headphone). In addition, another enhancement may make use of noise-cancelling microphones that use phase cancelation techniques to cancel out ambient noise. If such a microphone is used, it may be enabled under either operational mode (e.g., with our without preprocessing).

Figure 8:
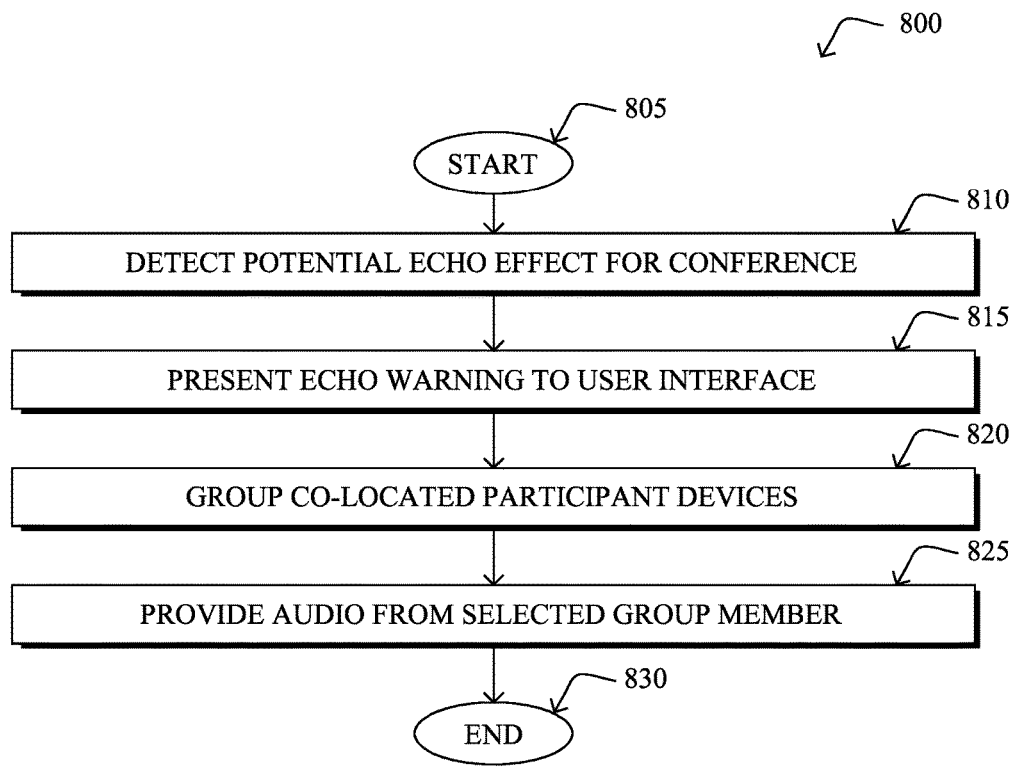
FIG. 8 illustrates an example simplified procedure for detecting potential echo effects.

FIG. 8 illustrates an example simplified procedure for detecting potential echo effects in an online conference, in accordance with one or more embodiments described herein. For example, a non-generic, specifically configured conferencing device (e.g., device 200) may perform procedure 800 by executing stored instructions (e.g., processes 244, 248). The procedure 800 may start at step 805, and continues to step 810, where, as described in greater detail above, the device may detect a potential for an echo effect in the online conference. Generally, such an effect occurs when participant devices are within proximity of one another such that the sound from one device is picked up by the microphone of another device.

In some embodiments, the conferencing device may detect the potential echo effect based on location information for the participant devices. For example, a collaboration or telepresence application may identify that a certain set of devices are all located within the same meeting room. In further embodiments, the conferencing device may determine that an echo effect exists based on an echo test performed by one of the participant devices (e.g., a device joining the conference). During such a test, the testing device may send out a sound, to see whether any other co-located participant devices are able to pick up the sound. Such a test may, in some cases, be initiated when a device joins the meeting/conference. For example, the joining device may send out the echo test immediately when joining the meeting or based on an instruction from the conferencing device. The echo test may also identify the meeting and/or the joining device, thereby allowing the receiver and/or the conferencing device to determine that the joining device is co-located with an existing participant device.

At step 815, as detailed above, the conferencing device may present an echo warning to a user interface, in response to detecting the potential echo effect. For example, if another participant is able to "hear" a device joining the conference, the conferencing device may cause a user interface of the joining device to warn the user about potential echo effects, based on the joining device being co-located with one or more other participant devices. In some cases, the warning may be merely a suggestion, allowing the user of the joining device to ignore the warning, as desired.

At step 820, the conferencing device may also group co-located participant devices into a group, as described in greater detail above. For example, if participant devices A-C are all co-located (e.g., based on an echo test, location data, etc.), the conferencing device may place participant devices A-C within the same location group.

At step 825, as detailed above, the device may provide audio from a selected group member from step 820 for presentation by the plurality of participant devices in the conference. In some cases, the conferencing device may select the group member based on user input. For example, a user may select the group member as the representative audio presenter for the location group. In another embodiment, the conferencing device may only enable the audio input (e.g., a microphone) for the selected group member. In further embodiments, the conferencing device may perform a pre-processing of audio inputs from multiple members of the location group, but select only one of the audio inputs for inclusion in the conference audio output signal. For example, the conferencing device may select the audio input from among the group having the strongest signal (e.g., highest volume). Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to prevent echo effects in an online meeting by detecting potential echoes and warning users beforehand. Further, the techniques allow users to identify nearby devices that can be used to share audio connections during the meeting. In addition, the techniques herein allow for the grouping of co-located participant devices, allowing for the dynamic selection of only one of the group members as active at any given time. Further, the techniques herein are more simplistic than other approaches that may use complex analysis to reduce echo effects.

While there have been shown and described illustrative embodiments that provide for potential echo detection and warnings, it is to be understood that various other adaptations and modifications may be made within the spirit and scope of the embodiments herein. For example, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    detecting, by a conferencing device, a potential echo effect between two or more of a plurality of participant devices in an online conference due to the two or more participant devices being co-located;
    presenting, by the conferencing device, an echo warning to a user interface of a particular one of the co-located participant devices, in response to detecting the potential echo effect;
    grouping, by the conferencing device, the co-located participant devices into a group; and
    providing, by the conferencing device, audio data from a selected one of the co-located participant devices in the group for presentation by the plurality of participant devices as part of the online conference.

2. The method as in claim 1, further comprising:
    providing, by the conferencing device, audio data from at least two of the co-located participant devices to the plurality of participant devices as part of the online conference, in response to an indication from the user interface that a user wishes to ignore the echo warning.

3. The method as in claim 1, wherein detecting the potential echo effect comprises:
    receiving a notification from a first one of the co-located participant devices that an audio sound emitted by a second one of the co-located participant devices was detected by the first co-located participant device.

4. The method as in claim 3, wherein the second co-located participant device emitted the audio sound in response to joining the online conference.

5. The method as in claim 1, wherein detecting the potential echo effect comprises:
    receiving, at the conferencing device, location information for the co-located participant devices.

6. The method as in claim 1, further comprising:
    preventing, by the conferencing device, audio data from at least one of the co-located participant devices in the group from being provided to the participant devices in the online conference.

7. The method as in claim 1, further comprising:
    providing, by the conferencing device, an indication to the user interface that the selected participant device in the group is acting as a sole source of audio for the group in the online conference.

8. An apparatus, comprising:
    one or more network interfaces to communicate with a network;
    a processor coupled to the network interfaces and configured to execute one or more processes; and
    a memory configured to store a process executable by the processor, the process when executed operable to:
        detect a potential echo effect between two or more of a plurality of participant devices in an online conference due to the two or more participant devices being co-located;
        present an echo warning to a user interface of a particular one of the co-located participant devices, in response to detecting the potential echo effect;
        group the co-located participant devices into a group; and
        provide audio data from a selected one of the co-located participant devices in the group for presentation by the plurality of participant devices as part of the online conference.

9. The apparatus as in claim 8, wherein the process when executed is further operable to:
    provide audio data from at least two of the co-located participant devices to the plurality of participant devices as part of the online conference, in response to an indication from the user interface that a user wishes to ignore the echo warning.

10. The apparatus as in claim 8, wherein the apparatus detects the potential echo effect by:
    receiving a notification from a first one of the co-located participant devices that an audio sound emitted by a second one of the co-located participant devices was detected by the first co-located participant device.

11. The apparatus as in claim 10, wherein the second co-located participant device emitted the audio sound in response to joining the online conference.

12. The apparatus as in claim 8, wherein the apparatus detects the potential echo effect by:
    receiving location information for the co-located participant devices.

13. The apparatus as in claim 8, wherein the process when executed is further operable to: prevent audio data from at least one of the co-located participant devices in the group from being provided to the participant devices in the online conference.

14. The apparatus as in claim 8, wherein the process when executed is further operable to:
    provide an indication to the user interface that that the selected participant device in the group is acting as a sole source of audio for the group in the online conference.

15. A tangible, non-transitory, computer-readable medium storing program instructions that cause a conferencing device to execute a process comprising:
    detecting, by the conferencing device, a potential echo effect between two or more of a plurality of participant devices in an online conference due to the two or more participant devices being co-located;
    presenting, by the conferencing device, an echo warning to a user interface of a particular one of the co-located participant devices, in response to detecting the potential echo effect;
    grouping, by the conferencing device, the co-located participant devices into a group; and
    providing, by the conferencing device, audio data from a selected one of the co-located participant devices in the group for presentation by the plurality of participant devices as part of the online conference.

16. The computer-readable medium as in claim 15, wherein the process further comprises:

providing, by the conferencing device, audio data from at least two of the co-located participant devices to the plurality of participant devices as part of the online conference, in response to an indication from the user interface that a user wishes to ignore the echo warning.

17. The computer-readable medium as in claim 15, wherein detecting the potential echo effect comprises:
receiving a notification from a first one of the co-located participant devices that an audio sound emitted by a second one of the co-located participant devices was detected by the first co-located participant device.

18. The computer-readable medium as in claim 17, wherein the second co-located participant device emitted the audio sound in response to joining the online conference.

19. The computer-readable medium as in claim 15, wherein the process further comprises:
preventing, by the conferencing device, audio data from at least one of the co-located participant devices in the group from being provided to the participant devices in the online conference.

20. The computer-readable medium as in claim 15, wherein the process further comprises:
providing, by the conferencing device, an indication to the user interface that the selected participant device in the group is acting as a sole source of audio for the group in the online conference.

* * * * *